United States Patent
Bruchmann et al.

(10) Patent No.: US 7,151,153 B2
(45) Date of Patent: Dec. 19, 2006

(54) USE OF HYPERBRANCHED POLYURETHANES FOR PRODUCING PRINTING INKS

(75) Inventors: Bernd Bruchmann, Freinsheim (DE); Joelle Bedat, Strasbourg (FR); Jürgen Kaczun, Niederkirchen (DE); Peter Poganiuch, Neustadt (DE)

(73) Assignees: BASF Aktiengesellschaft, Ludwigshafen (DE); XSYS Print Solutions Deutschland GmbH, Stuttgart (DE)

( * ) Notice: Subject to any disclaimer, the term of this patent is extended or adjusted under 35 U.S.C. 154(b) by 212 days.

(21) Appl. No.: 10/399,499

(22) PCT Filed: Oct. 30, 2001

(86) PCT No.: PCT/EP01/12521

§ 371 (c)(1),
(2), (4) Date: Apr. 17, 2003

(87) PCT Pub. No.: WO02/36695

PCT Pub. Date: May 10, 2002

(65) Prior Publication Data

US 2004/0097684 A1 May 20, 2004

(30) Foreign Application Priority Data

Oct. 31, 2000 (DE) .................. 100 54 054
May 30, 2001 (DE) .................. 101 26 200

(51) Int. Cl.
*C08G 18/67* (2006.01)

(52) U.S. Cl. .................. 528/75; 528/85; 522/90; 523/160

(58) Field of Classification Search .................. 528/75, 528/85; 522/90; 523/160
See application file for complete search history.

(56) References Cited

U.S. PATENT DOCUMENTS

| | | | |
|---|---|---|---|
| 4,155,892 A * | 5/1979 | Emmons et al. ............. | 524/507 |
| 4,666,984 A * | 5/1987 | Carlick et al. ............... | 525/131 |
| 5,120,361 A | 6/1992 | Winnik et al. ................. | 106/22 |
| 5,254,159 A | 10/1993 | Gundlach et al. ......... | 106/22 R |
| 5,266,106 A | 11/1993 | Breton ...................... | 106/22 R |
| 5,319,052 A | 6/1994 | Prantl et al. | |
| 5,534,049 A | 7/1996 | Wallström et al. ........ | 106/22 R |
| 5,556,925 A | 9/1996 | Kousaka et al. | |
| 5,646,200 A | 7/1997 | Duncan | |
| 5,886,091 A | 3/1999 | Harris et al. | |
| 5,936,055 A | 8/1999 | Elwell et al. | |
| 5,981,684 A | 11/1999 | Bruchmann et al. | |
| 6,096,801 A | 8/2000 | Vincent et al. ............. | 523/161 |
| 6,187,897 B1 | 2/2001 | Kawashima et al. | |
| 6,214,963 B1 | 4/2001 | Noguchi et al. | |
| 6,262,207 B1 | 7/2001 | Rao et al. .................... | 526/224 |
| 6,372,841 B1 | 4/2002 | Anderson et al. ........... | 524/507 |
| 6,518,370 B1 * | 2/2003 | Abuelyaman et al. ...... | 525/437 |
| 2003/0092797 A1 | 5/2003 | Wang et al. ................. | 523/161 |

FOREIGN PATENT DOCUMENTS

| | | |
|---|---|---|
| DE | 100 04495 | 8/2001 |
| DE | 100 23229 | 11/2001 |
| EP | 451 657 | 10/1991 |
| EP | 835 890 | 4/1996 |
| EP | 870 789 | 10/1998 |
| EP | 0 882 772 | 12/1998 |
| EP | 0 899 286 | 3/1999 |
| EP | 899 287 | 3/1999 |
| GB | 2 324 797 | 11/1998 |
| JP | 55120680 | 9/1980 |
| JP | 11/66148 | 12/1991 |
| JP | 03296577 | 12/1991 |
| WO | WO 96/13558 | 5/1996 |
| WO | 97/02304 | 1/1997 |
| WO | WO 97/03137 | 1/1997 |
| WO | WO 97/49774 | 12/1997 |
| WO | WO 98/36001 | 8/1998 |
| WO | WO 00/77070 | 12/2000 |
| WO | 200157149 | 8/2001 |
| WO | 200185820 | 11/2001 |

OTHER PUBLICATIONS

Ull. Ency. Ind. Chem. 6th Ed., 1999, Printing Inks.
J.M.S., Rev. Macromol. Chem. Phys, C37(3), 555-579 (1997).
365035, Sep. 1994 RD.

* cited by examiner

*Primary Examiner*—Rachel Gorr
(74) *Attorney, Agent, or Firm*—Novak Druce & Quigg, LLP

(57) ABSTRACT

Hyperbranched polyurethanes are used for the preparation of printing inks and of printing varnishes. Printing inks and printing varnishes contain the hyperbranched polyurethanes as binders.

12 Claims, No Drawings

USE OF HYPERBRANCHED POLYURETHANES FOR PRODUCING PRINTING INKS

The present invention relates to the use of hyperbranched polyurethanes for the preparation of printing inks and of printing varnishes. The invention further relates to printing inks and printing varnishes which comprise hyperbranched polyurethanes as binders.

In mechanical printing processes, such as offset printing, letterpress printing, flexographic printing, gravure printing or screen printing, the printing ink is transferred to the print medium by contact between a printing plate provided with printing ink and the print medium. Printing inks for these printing processes usually comprise solvents, colorants, binders and, if required, various additives. Binders serve for the formation of the ink film and for anchoring the components, for example pigments or fillers, in the ink film. Depending on the consistency, such printing-inks usually contain from 10 to 50% by weight of binder. Printing inks for mechanical printing processes include pasty printing inks having a high viscosity for offset and letterpress printing and liquid printing inks having comparatively low viscosity for flexographic and gravure printing. Further details are disclosed, for example, in "Printing Inks"—Ullmann's Encyclopedia of Industrial Chemistry, Sixth Edition, 1999 Electronic Release.

Printing varnishes are either applied as a primer to the print medium or as a coat to the printed print medium after the printing process. Printing varnishes are used, for example, for protecting the printed image, for improving the adhesion of the printing ink to the print medium or for aesthetic purposes. The application is usually effected inline by means of a coating unit on the printing press. Printing varnishes contain no colorant but, apart from this, generally have a composition similar to that of printing inks.

Polyurethanes or polyurethane derivatives are known as conventional components of printing inks. By way of example, reference may be made to U.S. Pat. No. 5,556,925, EP-A 451 657 or U.S. Pat. No. 5,886,091 at this point. Polyurethanes are frequently used as binders in aqueous or solventborne liquid printing inks for industrial printing of packaging for the production of packaging materials, such as cardboard boxes, carrier bags, heavy-duty bags, packaging for frozen goods, or giftwrapping papers. However, suitably modified polyurethanes are also used in pasty printing inks. For example, EP-A 451 657 discloses polyurethanes modified with drying oils, as binders for oxidatively curing offset printing inks.

In order to obtain the suitable polyurethane for the respective desired application, the use of a wide range of monomeric or oligomeric components has been proposed for the preparation of the binders. Reference may be made here to U.S. Pat. No. 5,556,925, JP-A 55 120 680, JP-A 03 296 577 or JP-A 11 166 148, by way of example. Such a procedure is, however, inconvenient and is uneconomical owing to the necessity of stocking a large number of components in small amounts and carrying out many syntheses in small batch sizes. It would be extremely desirable to be able to prepare polyurethanes for a wide range of intended uses in the printing ink sector from simple components according to a simple and as far as possible standardized synthesis scheme.

Furthermore, there is still a need for improving printing inks in important performance characteristics, such as the adhesion to the print medium, for example.

During printing on nonabsorptive print media, for example polymer films or metal foils, the printing ink cannot of course penetrate into the print medium and instead a dried film remains on the print medium after the solvent has evaporated off. Printing inks for such print media must therefore have very good film-forming properties and especially good abrasion resistance and adhesive strength so that the print film does not become detached from the substrate under mechanical stress. Printing inks comprising conventional binders do not have sufficient adhesive strength on many print media, so that adhesion promoters, such as certain silanes or titanates, have to be added. Reference may be made here by way of example to U.S. Pat. No. 5,646,200. For economic reasons and for simplifying the formulation, it would be desirable to be able to dispense with this addition. Moreover, it is generally desirable to minimize the proportion of printing ink components which have a low molecular weight and are therefore in principle capable of migration. Furthermore, however, the adhesion is not satisfactory on all print media, even with the addition of adhesion promoters, so that there is a need for improvement here.

Dendrimers, arborols, starburst polymers, highly branched and hyperbranched polymers are terms for polymeric structures which have a branched structure and high functionality. Dendrimers are macromolecules having a standard molecular composition and a highly symmetrical structure. They are produced in multistage syntheses and are accordingly very expensive.

In contrast, highly branched or hyperbranched polymers vary both in molecular composition and in structure. They have branches of different lengths and branching structure. The $AB_x$ monomers are particularly suitable for synthesizing hyperbranched polymers. Said monomers have two different functional groups A and B which can react with one another with the formation of a link. The functional group A is present only once per molecule and the functional group B two or more times. As a result of the reaction of said $AB_x$ monomers with one another, uncrosslinked polymers having regularly arranged branching points are formed. The polymers most exclusively have B groups at the chain ends. Further details are to be found, for example, in J.M.S.—Rev. Macromol. Chem. Phys., C37(3), 555–579 (1997).

Dendrimers and hyperbranched polyurethanes are known in principle. Examples of these are disclosed in WO 97/02304, DE-A 199 04 444 or U.S. Pat. No. 5,936,055. The use of such polymers for the preparation of printing inks having a novel property profile was, however, not known to date.

It is an object of the present invention to provide polyurethane-containing printing inks and printing varnishes which have a novel property profile, in which the polyurethanes used can be prepared according to a simple synthesis principle and which can be adapted in a simple manner to the various intended uses. It is a particular object of the present invention to provide polyurethane-containing printing inks having improved adhesion. We have found, surprisingly, that this object is achieved by the use of hyperbranched polyurethanes.

Accordingly, we have found the use of hyperbranched polyurethanes for the preparation of printing inks and printing varnishes, and printing inks and printing varnishes which comprise the hyperbranched polyurethanes as binders.

Regarding the present invention, the following may be stated specifically:

In the context of this invention, the term polyurethanes includes not only those polymers which are linked exclusively by urethane groups but in a more general sense polymers which can be obtained by reacting di- or polyisocyanates with compounds having active hydrogen and which may be linked by urethane structures but also, for example, by urea, allophanate, biuret, carbodiimide, amide, uretonimine, uretdione, isocyanurate or oxazolidone structures or combinations thereof (cf. for example "Kunststoff-Taschenbuch"/Saechtling, 26$^{th}$ Edition, page 491 et seq., Carl-Hanser-Verlag, Munich 1995). In the context of this invention, the term polyurethanes extends in particular to cover polyurea polyurethanes and polyureas.

The present invention is preferably carried out using hyperbranched structures in the actual sense, i.e., using polymers having a variant molecular composition and structure. However, dendrimeric polyurethanes having uniform structure and molecular composition can of course also be used. In the context of this invention, the term hyperbranched polyurethane therefore also includes dendrimeric polyurethanes.

The synthesis of the hyperbranched polyurethanes used for carrying out the present invention can be effected, for example, as described below, without the present invention thereby being restricted to the use of the polyurethanes synthesized by this preparation method.

For the synthesis of the hyperbranched polyurethanes, it is preferable to use $AB_x$ monomers which have both isocyanate groups and groups which can react with isocyanate groups with formation of a link. x is a natural number from 2 to 8. x is preferably 2 or 3. Either A are the isocyanate groups and B are groups reactive therewith, or vice versa.

The groups reactive with the isocyanate groups are preferably OH—, $NH_2$—, NH—, SH— or COOH groups.

The $AB_x$ monomers can be prepared in a known manner by means of various techniques.

$AB_x$ monomers can be synthesized, for example, by the method disclosed in WO 97/02304, using protective group techniques. By way of example, this technique is explained for the preparation of an $AB_2$ monomer from tolylene 2,4-diisocyanate (TDI) and trimethylolpropane. First, one of the isocyanate groups of the TDI is blocked in a known manner, for example by reaction with an oxime. The remaining free NCO group is reacted with trimethylolpropane, only one of the three OH groups reacting with the isocyanate group, and the two other groups being protected by acetalization. After elimination of the protective group, a molecule having one isocyanate group and 2 OH groups is obtained.

The $AB_x$ molecules can be particularly advantageously synthesized by the method disclosed in DE-A 199 04 444, in which no protective groups are required. In this method, di- or polyisocyanates are used and are reacted with compounds which have at least two groups reactive with isocyanate groups. At least one of the reactants has groups having a reactivity differing from that of the other reactant. Preferably, both reactants have groups having a reactivity differing from that of the other reactant. The reaction conditions are chosen so that only specific reactive groups can react with one another.

Preferred di- and/or polyisocyanates are in particular readily and cheaply available isocyanates, for example aromatic isocyanates, such as tolylene 2,4-diisocyanate (2,4-TDI), diphenylmethane 2,4'-diisocyanate (2,4'-MDI), and triisocyanatotoluene, and aliphatic isocyanates, such as hexamethylene diisocyanate (HDI), isophorone diisocyanate (IPDI), 2-butyl-2-ethylpentamethylene diisocyanate, 2-isocyanatopropylcyclohexyl isocyanate, 2,4,4- and 2,2,4-trimethylhexamethylene diisocyanate, methylenebis(cyclohexyl) 2,4'-diisocyanate and 4-methylcyclohexane 1,3-diisocyanate (H-TDI). Mixtures of said isocyanates can of course also be used.

Preferably used compounds having at least two groups reactive with isocyanates are di-, tri- or tetrafunctional compounds whose functional groups have different reactivities with respect to NCO groups. Compounds having at least one primary and at least one secondary hydroxyl group, at least one hydroxyl group and at least one mercapto group, particularly preferably having at least one hydroxyl group and at least one amino group in the molecule, in particular amino alcohols, aminodiols and aminotriols, are preferred, since the reactivity of the amino group is substantially higher compared with the hydroxyl group in the reaction with isocyanate.

Examples of said compounds having at least two groups reactive with isocyanates are propylene glycol, glycerol, mercaptoethanol, ethanolamine, N-methylethanolamine, diethanolamine, ethanolpropanolamine, dipropanolamine, diisopropanolamine, 2-amino-1,3-propanediol, 2-amino-2-methyl-1,3-propanediol and tris(hydroxymethyl)aminomethane. Furthermore, mixtures of said compounds may also be used.

The preparation of an $AB_2$ molecule is to be explained by way of example for the reaction of a diisocyanate with an aminodiol. Here, first one mole of a diisocyanate is reacted with one mole of an aminodiol at low temperatures, preferably from −10 to 30° C. In this temperature range, virtually complete suppression of the urethane formation reaction takes place and the NCO groups of the isocyanate react exclusively with the amino group of the aminodiol. The $AB_x$ molecule formed has one free NCO group and two free OH groups and can be used for the synthesis of a hyperbranched polyurethane.

By heating and/or catalyst addition, this $AB_2$ molecule can undergo intermolecular reaction to give a hyperbranched polyurethane. The synthesis of the hyperbranched polyurethane can advantageously be carried out without prior isolation of the $AB_x$ molecule in a further reaction step at elevated temperatures, preferably at from 30 to 80° C. For the use of the described $AB_2$ molecule having two OH groups and one NCO group, a hyperbranched polymer which has one free NCO group and, depending on the degree of polymerization, a larger or smaller number of OH groups per molecule is formed. The reaction can be carried out to high conversions, with the result that very high molecular weight structures are obtained. However, it can also be stopped on reaching the desired molecular weight, for example by adding suitable monofunctional compounds or by adding one of the starting compounds for the preparation of the $AB_2$ molecule. Depending on the starting compound used for stopping, either completely NCO-terminated or completely OH-terminated molecules form.

Alternatively, for example, an $AB_2$ molecule can also be prepared from one mole of glycerol and 2 mol of TDI. At a low temperature, the primary alcohol groups and the isocyanate group in the 4-position preferably react, and an adduct is formed which has one OH group and two isocyanate groups and which can be reacted in the manner described at relatively high temperatures to give a hyperbranched polyurethane. A hyperbranched polymer which has one free OH group and, depending on the degree of polymerization, a larger or smaller number of NCO groups initially forms.

The preparation of the hyperbranched polyurethanes can be carried out in principle without solvents, but preferably in solution. Solvents which are suitable in principle are all compounds which are liquid at the reaction temperature and are inert to the monomers and polymers.

Other products are obtainable by further synthesis variants. The following may be mentioned by way of example at this point:

$AB_3$ molecules can be obtained, for example, by reacting diisocyanates with compounds having at least 4 groups reactive toward isocyanates. The reaction of tolylene diisocyanate with tris(hydroxymethyl)aminomethane may be mentioned by way of example.

In order to stop the polymerization, polyfunctional compounds which are capable of reacting with the respective A groups may be used. In this way, a plurality of small hyperbranched molecules can be linked to form a large hyperbranched molecule.

Hyperbranched polyurethanes having branches with extended chains can be obtained, for example, by using for the polymerization reaction, in addition to the $AB_x$ molecules, in the molar ratio of 1:1, a diisocyanate and a compound which has two groups reactive with isocyanate groups. These additional AA or BB compounds may also have further functional groups which however must not be reactive toward the A or B groups under the reaction conditions. In this way, further functionalities can be introduced into the hyperbranched polymer.

Further synthesis variants for the hyperbranched polyurethanes are mentioned in our unpublished applications DE 100 13 187.5 and DE 100 30 869.4.

The hyperbranched and highly functional polyurethanes obtained may be used as such for the preparation of printing inks or of printing varnishes, provided that the functional groups obtained in the course of the respective embodiment of the synthesis are suitable for the desired application.

Particularly advantageously, the functional groups may be rendered hydrophobic, rendered hydrophilic or converted. In this way, polymers particularly adapted to the respective use of the printing ink are obtainable. Owing to their reactivity, those hyperbranched polyurethanes which have isocyanate groups are very particularly suitable for conversion of functionality. Of course, OH- or $NH_2$-terminated polyurethanes may also be converted by means of suitable reactants.

Examples of groups which are introduced by means of suitable reactants include —COOH, —COOR, —CONHR, —CONH$_2$, —OH, —SH, —NH$_2$, —NHR, —NR$_2$, —SO$_3$H, —SO$_3$R, —NHCOOR, —NHCONH$_2$, —NHCONHR and —CN, there being no intention to restrict the list to these. The radicals R of said groups are as a rule straight-chain or branched alkyl radicals or aryl radicals, which may also be further substituted, for example by $C_1$–$C_8$-alkyl or $C_5$–$C_{12}$-aryl radicals.

Groups which have sufficiently acidic H atoms can be converted into the corresponding salts by treatment with suitable bases. In an analogous manner, basic groups can be converted into the corresponding salts using suitable acids. Water-soluble hyperbranched polyurethanes can thus be obtained.

By reacting NCO-terminated products with alkanols and alkylamines, in particular alkanols and alkylamines having $C_8$–$C_{40}$-alkyl radicals, hydrophobic products can be obtained.

Hydrophilic but nonionic products can be obtained by reacting NCO-terminated polymers with polyether alcohols, for example di-, tri- or tetra- or polyethylene glycol; however, the reaction with polyethylene oxide alcohols monofunctional with respect to OH groups is particularly preferred here.

Acid groups can be introduced, for example, by reaction with hydroxycarboxylic acids, mercaptocarboxylic acids, hydroxysulfonic acids or amino acids. Examples of suitable reactants are hydroxyacetic acid, hydroxypivalic acid, 4-hydroxybenzoic acid, 12-hydroxydodecanoic acid, 2-hydroxyethanesulfonic acid, mercaptoacetic acid, glycine, β-alanine and taurine.

By reaction with compounds containing acrylate groups, for example alcohols containing acrylate groups, such as 2-hydroxyethyl acrylate or 2-hydroxyethyl methacrylate, it is possible to obtain hyperbranched polyurethanes which have polymerizable olefinic groups and which can be used for the preparation of radiation-crosslinkable, in particular UV-crosslinkable, printing inks. By reaction with correspondingly substituted alcohols, it is also possible to introduce epoxide or vinyl ether groups, giving products which can be used for cationically crosslinkable printing inks.

Oxidatively drying hyperbranched polyurethanes, which are suitable in particular for offset or letterpress printing inks but also certain gravure printing inks, can be obtained by first reacting monounsaturated or polyunsaturated fatty acids, in particular $C_8$–$C_{40}$ fatty acids, with an aliphatic alcohol having at least two OH groups, where at least one OH group must not be esterified. For example, linoleic acid, linolenic acid or eleostearic acid may be reacted. The fatty ester obtained, which still has OH groups, is then reacted with the NCO groups.

Furthermore, however, the NCO groups can also be reacted directly with vinyl- or allyl-containing alcohols.

It is also possible to bind suitable dyes—for example, in analogy to U.S. Pat. No. 5,886,091, those which have a polyoxyalkylene spacer with a free OH group—directly to the hyperbranched polyurethane. In this way, materials having a very particularly intense color are obtained.

It is also possible to produce hyperbranched polyurethanes which have different functionalities. This can be effected, for example, by reaction with a mixture of different compounds. For example, it is possible to produce such polyurethanes by reacting two moles of TDI with a mixture of one mole of trimethylolpropane and one mole of dimethylolpropionic acid. This gives a product which has both carboxyl groups and OH groups.

Furthermore, such products can also be obtained by effecting polymerization with an $AB_x$ molecule, terminating the polymerization at the desired conversion and then reacting only some of the functional groups which were originally present, for example only some of the OH or of the NCO groups. For example, in an NCO-terminated polymer of TDI and glycerol, half the NCO groups can thus be reacted with ethanolamine and the other half of the NCO groups with mercaptoacetic acid.

Furthermore, an OH-terminated polymer of isophorone diisocyanate and diethanolamine can be subsequently rendered hydrophobic in a similar manner by reacting, for example, half the OH groups with dodecyl isocyanate or with dodecanoic acid.

The conversion of a hyperbranched polyurethane or the adaptation of the polymer properties to the application problem can advantageously be effected directly after the polymerization reaction, without the NCO-terminated polyurethane being isolated beforehand. However, the functionalization can also be effected in a separate reaction.

The hyperbranched polyurethanes obtainable by the process described are used for the preparation of printing inks or of printing varnishes. They may be used as an additive, for example as dispersant, stabilizer or adhesion promoter. However, the use as a binder for printing inks or printing varnishes is very particularly preferred.

The degree of polymerization, molar mass and type and number of functional groups can be chosen by a person skilled in the art according to the intended use.

However, the hyperbranched polyurethanes used according to the invention for the preparation of printing inks or printing varnishes generally have at least 4 functional groups. There is in principle no upper limit to the number of functional groups. However, products having too large a number of functional groups frequently have undesirable properties, for example poor solubility or very high viscosity. The hyperbranched polyurethanes used according to the invention therefore generally have not more than on average 100 functional groups. Preferably, the hyperbranched polyurethanes have from 4 to 30, more preferably from 4 to 20, functional groups.

The molar masses of the hyperbranched polyurethanes used according to the invention depend on the respective application and are chosen accordingly by a person skilled in the art. Products having a weight average molecular weight $M_W$ of from 500 to 50 000 g/mol, preferably from 1000 to 20 000 g/mol, and with particular preference from 1000 to 10 000 g/mol, have proven useful.

The hyperbranched polyurethanes used according to the invention can act as the sole binder for the printing ink or the printing varnish, but mixtures of a plurality of different hyperbranched polyurethanes or else hyperbranched polyurethanes as a mixture with other binders may also be used.

The hyperbranched polyurethanes may be used both for solventborne printing inks and printing varnishes and for radiation-curable, in particular UV-curable, printing inks and printing varnishes, which as a rule comprise no solvent or at most small amounts thereof.

The novel solventborne printing inks comprise at least one solvent or a mixture of different solvents, at least one colorant, one or more binders and optionally further additives.

The novel solventborne printing varnishes comprise at least one solvent or a mixture of different solvents, one or more binders and optionally further additives.

At least one of the binders is a hyperbranched polyurethane. It is also possible to use a plurality of different hyperbranched polyurethanes as binders. The functional groups, in particular the terminal functional groups, can be chosen according to the respective application. —COOH, —CONH$_2$, —OH, —SH, —NH2, —HNR, —NR$_2$, —SO$_3$H and salts or derivatives of these groups have proven particularly useful as functional groups. OH-terminated or COOH-terminated hyperbranched polyurethanes have proven to be very particularly advantageous for packaging printing inks for printing on polyolefin, PET or polyamide films. The use of hyperbranched polyurethanes which comprise both OH and COOH groups is particularly advantageous for this intended use.

The hyperbranched polyurethanes can be used as a mixture with other binders, provided that no undesirable effects, for example precipitates, occur as a result of mixing. Examples of further binders include polyvinylbutyral, nitrocellulose, polyamides and polyacrylates or polyacrylate copolymers. The use of the hyperbranched polyurethanes as a mixture with nitrocellulose has proven particularly advantageous. Usually, 10–50% by weight, based on the sum of all components, are used as binders.

Solvents serve for dissolving the binders, but they also serve for establishing important properties, such as the viscosity or the drying rate. The type of solvent depends on the respective intended use of the printing ink, and the solvents customary in printing inks can in principle be used in a known manner as solvents or as components of solvent mixtures. The choice is limited only by the fact that the hyperbranched polyurethane used in each case must have sufficient solubility in the solvent. Examples of such solvents or components of solvent mixtures include hydrocarbons, such as toluene or xylene, high-boiling mineral oils or vegetable oils, for example soyabean oil, alcohols, for example ethanol, 1-propanol, 2-propanol, ethylene glycol, propylene glycol or diethylene glycol, substituted alcohols, for example ethoxypropanol, and esters, for example ethyl acetate, isopropyl acetate, n-propyl acetate or n-butyl acetate. Mixtures of different solvents can of course also be used. Water or a predominantly aqueous solvent mixture is of course also suitable in principle as a solvent. Depending on the type of printing ink or of printing varnish, usually from 20 to 80% by weight, based on the sum of all components, of solvent are used.

The colorants used may be the dyes conventionally used in printing inks, in particular conventional pigments. Examples are inorganic pigments, for example titanium dioxide pigments or iron oxide pigments, interference pigments, carbon blacks, metal powders, in particular aluminum, brass or copper powder, and organic pigments, such as azo, phthalocyanine or isoindoline pigments. It is of course also possible to use mixtures of different dyes or colorants. Soluble organic dyes may also be used. Soluble dyes can particularly advantageously be bound directly to the hyperbranched polyurethane via a suitable spacer, resulting in printing inks having a particularly high color strength. The amount of colorant is usually 5–25% by weight, based on the sum of all components of the printing ink. Of course, printing varnishes contain no colorant.

The novel printing inks or printing varnishes may optionally comprise further additives and assistants. Examples of additives and assistants are fillers, such as calcium carbonate, hydrated alumina, aluminum silicate or magnesium silicate. Waxes increase the abrasion resistance and serve for reducing the friction. Examples are in particular polyethylene waxes, oxidized polyethylene waxes, petroleum waxes and ceresin waxes. Fatty acid amides can be used for increasing the surface smoothness. Plasticizers serve for increasing the resilience of the dried film. Examples are phthalic esters, such as dibutyl phthalate, diisobutyl phthalate or dioctyl phthalate, citric esters or esters of adipic acid. In the case of oxidatively drying printing inks, drying agents, such as specific cobalt, manganese or cerium salts, may be used. Dispersants may be used for dispersing the pigments. In the case of the novel printing inks or printing varnishes, adhesion promoters can advantageously be dispensed with, although there is no intention thereby to rule out the use of adhesion promoters. The total amount of all additives and assistants usually does not exceed 20% by weight, based on the sum of all components, and is preferably 0–10% by weight.

The preparation of the novel solventborne printing inks or printing varnishes can be carried out in a manner known in principle, by thorough mixing or dispersing of the components in a conventional apparatus, for example a dissolver, a stirred ball mill or a three-roll mill. Advantageously, a concentrated pigment dispersion is first prepared with a part of the components and is subsequently further processed with further components and further solvent to give the finished printing ink.

The novel radiation-curable printing inks comprise at least one colorant, one or more binders and optionally further additives.

The novel radiation-curable printing varnishes comprise at least one or more binders and optionally further additives.

As a rule, a reactive diluent is also used in each case.

In principle, the conventional colorants also known in the case of solventborne inks may be used as colorants. Usually, from 5 to 25% by weight, based on the sum of all components, of colorants are used. No colorant is used for printing varnishes.

For the radiation curing, high-energy electromagnetic radiation, particularly UV radiation or electron beams, are used in a known manner. During curing by means of electron beams, an additional initiator is not required. During curing by means of UV radiation, a photoinitiator or photoinitiator system is additionally required as a component of the printing ink. The curing can be effected in principle by means of free radicals or cationically.

At least one of the binders is a hyperbranched polyurethane which has crosslinkable groups. Hyperbranched polyurethanes which have olefinic groups or vinyl ether or epoxide groups are particularly suitable, these groups being introduced in the manner described above. The hyperbranched polyurethane used may have exclusively such crosslinkable groups, but it may advantageously also have crosslinkable groups in combination with other groups, provided that the groups used are compatible with one another. The combination of COOH and/or OH groups with olefinic groups is particularly suitable. The COOH and/or OH groups advantageously ensure better adhesion in comparison with systems without such groups. It is of course also possible to use two or more different hyperbranched polyurethanes or mixtures of hyperbranched polyurethanes with other crosslinkable polymers, provided that the polymers are compatible with one another in each case. Usually, 50–90% by weight, based on the sum of all components, of binder are used.

The radiation-curable printing ink or the printing varnish further generally comprises at least one reactive diluent, in particular for establishing the viscosity of the printing ink. The reactive diluents used may be the conventional reactive diluents known in principle to a person skilled in the art. Examples include butyl acrylate, 2-ethylhexyl acrylate and in particular polyfunctional acrylates, such as butanediol 1,4-di(meth)acrylate, hexanediol 1,6-di(meth)acrylate or trimethylolpropane tri(meth)acrylate. Further examples include vinyl ethers, for example n-butyl vinyl ether, 1,4-butanediol divinyl ether or diethylene glycol divinyl ether, or glycidyl ethers, such as butyl glycidyl ether or ethylene glycol diglycidyl ether. The amount of reactive diluent is determined by the person skilled in the art according to the desired use of the novel printing ink. Usually, however, not more than 30% by weight of reactive diluent should be used in the printing ink comprising hyperbranched polyurethane.

Since the amount of reactive diluent cannot be increased as desired for reducing the viscosity, there is a tendency to use polymers having a low molar mass and not too high a functionality for liquid printing inks for the packaging sector. Hyperbranched polymers having molar masses of less than 10 000 g/mol, and in particular less than 5000 g/mol have proven useful for this application, without there being any intention thereby of completely ruling out the use of polymers having higher molar masses. In the case of pasty printing inks, hyperbranched polyurethanes having a higher molar mass may also be used.

The conventional photoinitiators for free radical or cationic polymerization may be used as photoinitiators or photoinitiator systems. Examples include benzophenone and benzophenone derivatives, benzoin ether derivatives or diacylphosphine oxides for printing inks curable by means of free radicals, and specific sulfonium salts for cationically curable printing inks. In the case of UV-curable printing inks, usually 5–15% by weight, based on the sum of all components, of photoinitiator are used. Conventional additives may also be used.

The use of solvents in UV-curable systems is in general neither desirable nor expedient. However, the novel UV-curable printing ink can of course additionally comprise a solvent in special cases.

Compared with the corresponding products comprising conventional binders, the novel liquid printing inks or printing varnishes have substantially improved adhesion, in particular to nonabsorbtive print media, such as metal foils or plastics films, both in reverse printing and in frontal printing. The addition of adhesion promoters is generally not necessary. Owing to these properties, they are also very useful for the production of laminated packaging. For this purpose, for example, PET or polyolefin films printed with the novel ink are laminated to a further plastics film or metal foil. The resulting laminates have an excellent composite strength even under harsh conditions, such as when heated in water or sterilized using steam, for example.

Furthermore, the printing inks or printing varnishes can be adapted in a particularly simple manner for various applications by the preparation process described for the hyperbranched polyurethanes. Thus, a base polymer, for example having isocyanate or OH functionalities, can be synthesized on a relatively large scale. The adaptation to the respective intended use can then be effected batchwise on a smaller scale by incorporating different types and numbers of functional groups. A large number of different hyperbranched polyurethanes having a very wide range of properties is obtainable from a few $AB_x$ building blocks of different structures and a few functionalizing agents, simply by combination in pairs. The use of hyperbranched polyurethanes for the preparation thus makes a substantial contribution to the standardization and to the economical production of printing inks.

The examples which follow illustrate the invention without limiting the scope of the invention.

For the examples, the following hyperbranched polyurethanes were used:

Polymer 1: Hyperbranched polyurea-polyurethane from hexamethylene diisocyanate (HDI) and diethanolamine (DEA), OH-terminated 672 g of HDI dissolved in 672 g of dimethylacetamide (DMAc) were charged to a vessel under nitrogen blanketing and cooled to 0° C. Then at this temperature a solution of 422 g of diethanolamine in 422 g of DMAc was added over the course of 120 minutes with thorough stirring. Following the addition, the reaction solution was heated to 50° C. and the decrease from the NCO content was monitored titrimetrically. When an NCO content of 3.4% was reached, the mixture was cooled to 20° C., a further 162 g of diethanolamine dissolved in 162 g of DMAc were added, and stirring was continued for a further 30 minutes. The reaction solution was then freed from the solvent under reduced pressure on a rotary evaporator. The reaction product had the following parameters:

Average molar mass, calc.: 1840 g/mol

Average functionality: about 9 OH

Polymer 2: Hyperbranched polyurea-polyurethane from hexamethylene diisocyanate (HDI) and diisopropanolamine (DIIPA), OH-terminated 672 g of HDI dissolved in 672 g of dry tetrahydrofuran (THF) were charged to a vessel under nitrogen blanketing and cooled to 0° C. Then at this temperature a solution of 532 g of DIIPA in 532 g of THF was added over the course of 60 minutes with thorough stirring. Following the addition, the reaction solution was heated to 50° C. and the decrease from the NCO content was monitored titrimetrically. When an NCO content of 2.2% was reached, the mixture was cooled to 20° C., a further 180 g of DIIPA dissolved in 180 g of THF were added, and stirring was continued for a further 30 minutes. The reaction solution was then freed from the solvent under reduced pressure on a rotary evaporator. The reaction product had the following parameters:
Average molar mass, calc.: 1037 g/mol
Average functionality: about 6 OH Polymer 3: Hyperbranched polyurethane from isophorone diisocyanate (IPDI), trimethylolpropane (TMP) and β-alanine COOH-terminated 1000 g of IPDI were charged to a vessel under nitrogen blanketing and 300 g of TMP dissolved in 1300 g of ethyl acetate were added over 1 minute with thorough stirring. Following the addition of 0.2 g of dibutyltin dilaurate, the reaction mixture was stirred at 50° C. and the decrease from the NCO content was monitored titrimetrically. When an NCO content of 4.2% was reached, 75 g of tosyl isocyanate were added as a stopper. Stirring was continued for 1 h and the solvent was then removed on a rotary evaporator. The reaction product had an average NCO functionality of 7.

400 g of this NCO-containing reaction product was dissolved in 400 g of dry acetone and the solution was heated to 50° C. Then a mixture consisting of 16 g of NaOH in 160 g of water and 36 g of β-alanine in 80 g of acetone was added. Following the addition, a solid precipitated. The suspension was stirred at 50° C. for 30 minutes more and the solvent mixture was then removed under reduced pressure on a rotary evaporator. The residue was dissolved in 2000 ml of water and neutralized with dilute hydrochloric acid. The precipitated end product was filtered off with suction and dried under reduced pressure.
Average molar mass, calc.: 3758 g/mol
Average functionality: about 7 COOH Polymer 4: Hyperbranched polyurethane from isophorone diisocyanate (IPDI), trimethylolpropane (TMP), HDI polymer and β-alanine, COOH-terminated 500 g of IPDI were charged to a vessel under nitrogen blanketing and 150 g of TMP dissolved in 650 g of ethyl acetate were added over 1 minute with thorough stirring. Following addition of 0.2 g of dibutyltin dilaurate, the reaction mixture was stirred at 50° C. and the decrease from the NCO content was monitored titrimetrically. When an NCO content of 5.8% was reached, 172 g of BASONAT HI 100 (HDI-based polyisocyanate from BASF AG, NCO content 22% by weight) were added as a stopper. Stirring was continued for 3 h and the solvent was then removed on a rotary evaporator. The reaction product had an average NCO functionality of about 13.

1000 g of this NCO-containing reaction product was dissolved in 1000 g of dry acetone. Then a mixture consisting of 47 g of NaOH in 470 g of water and 105 g of β-alanine in 235 g of acetone was added. The reaction mixture was stirred at 40° C. for 30 minutes more and the solvent mixture was then removed under reduced pressure on a rotary evaporator. The residue was dissolved in water and neutralized with dilute hydrochloric acid. The precipitated end product was filtered off with suction and dried under reduced pressure.
Average molar mass, calc.: 7248 g/mol
Average functionality: about 13 COOH Polymer 5: Hyperbranched polyurethane from tolylene 2,4'-diisocyanate (TDI), trimethylolpropane, diphenylmethane 4,4'-diisocyanate (MDI) and hydroxypivalic acid, COOH-terminated 400 g of 2,4-TDI were charged to a vessel under nitrogen blanketing and 155 g of TMP dissolved in 555 g of 2-butanone were added over 1 minute with thorough stirring. Following the addition of 0.2 g of dibutyltin dilaurate, the reaction mixture was stirred at 60° C. and the decrease in the NCO content was monitored titrimetrically. When an NCO content of 6.5% was reached, 94 g of diphenylmethane 4,4'-diisocyanate dissolved in 94 g of 2-butanone were added and the mixture was stirred at 60° C. for 3 h. Then 114 g of hydroxypivalic acid dissolved in 280 g of 2-butanone, and 0.1 g of dibutyltin dilaurate, were added, stirring was continued for 60° C. for 8 h, and finally 100 g of methanol were added. The solvent mixture was removed from the rotary evaporator and the product was dried under reduced pressure.
Average molar mass, calc.: 2723 g/mol
Average functionality: about 6 COOH Polymer 6: Hyperbranched polyurethane from hexamethylene diisocyanate (HDI), dimethylolpropionic acid (DMPA) and trimethylolpropane (TMP), COOH- and OH-terminated 100 g of HDI dissolved in 250 g of dimethylacetamide (DMAc) were charged to a vessel under nitrogen blanketing. Then 79.7 g of dimethylolpropionic acid dissolved in 115 g of DMAc were added over 1 minute with thorough stirring. Following the addition of 0.2 g of dibutyltin dilaurate, the reaction mixture was heated to 70° C. and the decrease in the NCO content was monitored titrimetrically. When an NCO content of 1.5% was reached, 13.5 g of trimethylolpropane dissolved in 50 g of DMAc were added and stirring was continued at 70° C. for 1 h. The product was then freed from the solvent on a rotary evaporator, under reduced pressure.
Average molar mass, calc.: 2793 g/mol
Average functionality: about 9 COOH and 3 OH Polymer 7: Hyperbranched polyurethane from isophorone diisocyanate (IPDI), dimethylolpropionic acid (DMPA), trimethylolpropane (TMP) and polytetrahydrofuran, COOH- and OH-terminated 222 g of IPDI were charged to a vessel under nitrogen blanketing. Then the mixture of 69 g of TMP and 67 g of dimethylolpropionic acid dissolved in 356 g of DMAc was added over 1 minute with thorough stirring. Following the addition of 0.4 g of dibutyltin dilaurate, the reaction mixture was heated to 60° C., and stirred at this temperature, and the decrease in the NCO content was monitored titrimetrically. When an NCO content of 1.0% was reached, 32 g of PolyTHF 250 (polytetrahydrofuran, average molar mass 250 g/mol, BASF AG) were added and stirring was continued at 60° C. for 3 h. During this time the NCO content of the mixture dropped to 0%. The product was then freed from the solvent on a rotary evaporator, at 60° C. under reduced pressure.
Average molar mass, calc.: 4408 g/mol
Average functionality: about 6 COOH and 8 OH Polymer 8: Hyperbranched polyurethane from hexamethylene diisocyanate (HDI), dimethylolpropionic acid (DMPA) and trimethylolpropane (TMP), COOH- and OH-terminated 400 g of HDI were charged to a vessel under nitrogen blanketing at room temperature. Then a mixture of 160 g of dimethylolpropionic acid, 160 g of trimethylolpropane and 720 g of DMAc was added over 2 minutes with thorough stirring. Following the addition of 0.5 g of dibutyltin dilaurate, the reaction mixture was heated to 70° C. and the decrease in the NCO content was monitored titrimetrically. When an NCO content of 0.9% was reached, 100 g of methanol were added and stirring was continued at 70° C. for 30 minutes. The product was then freed from the solvent on a rotary evaporator, under reduced pressure.

Average molar mass, calc.: 2451 g/mol

Average functionality: about 4 COOH and 5 OH

Inventive Printing Inks with Hyperbranched Polyurethanes

The quality of the inventive printing inks was determined on the basis of the adhesion of the printing ink.

For this purpose, two series of tests were conducted:

First, the adhesion of the printing ink film to different print media was measured.

Secondly, the printing inks were used to produce film laminates and the composite strength was measured under different conditions. The film laminates are used, for example, to produce laminated packaging.

EXAMPLES 1–16

Determination of Adhesion of the Printing Ink Systems Comprising Hyperbranched Polymers to Different Print Media in Comparison with a Standard System Tesa-Strength Measurement Method The "Tesa-strength" test method is used to determine the adhesion of a printing ink film for the print medium.

Sample Preparation

The ink, diluted to printing viscosity, is pressed onto the prescribed print medium or drawn down using a 6 μm doctor knife.

Test Procedure

A strip of Tesa tape (adhesive tape with a width of 19 mm—45 Article code BDF 4104 from Beiersdorf AG) is stuck onto the printing ink film, pressed down evenly and pulled off again after 10 seconds. This procedure is repeated 4 times at the same site of the test specimen, in each case using a new strip of tape. Each strip of tape is stuck successively onto a piece of white paper, or to black paper in the case of white inks. Testing is carried out immediately following application of the ink.

Evaluation

A visual examination is made of the surface of the test specimen for damage. Scoring is from 1 (very poor) to 5 (very good).

For the examples, the following standard formulation (in parts by weight) was chosen:
70.0 pigment preparation (BASF Drucksysteme)
8.0 nitrocellulose (Wolf)
1.0 oleamide (Croda)
0.5 PE waxes (BASF AG)
2.0 dibutyl phthalate (Brenntag)
10.5 ethanol
6.0* polyurethane cobinder (as per Tables 1 and 2)
2.0** titanium chelate (Du Pont)

*=the polyurethane was prepared as a 75% strength solution in ethanol

**=titanium chelate was omitted in the second test series (Table 2).

TABLE 1

Standard PU binder in comparison with hyperbranched polyurethanes

| | | Print medium (film) | | |
|---|---|---|---|---|
| Example | Cobinder | PP | PET Melinex 800 | PA Walomid XXL |
| 1 (Comparative) | Standard polyurethane (PUR 7313, BASF) | 5 | 3 | 1 |
| 2 | Polymer 1 | 4 | 5 | 4.5 |
| 3 | Polymer 2 | 5 | 5 | 4.5 |
| 4 | Polymer 3 | 3.5 | 4.5 | 3.5 |
| 5 | Polymer 5 | 5 | 3 | 4 |
| 6 | Polymer 6 | 5 | 5 | 5 |
| 7 | Polymer 7 | 5 | 4 | 5 |
| 8 | Polymer 8 | 5 | 5 | 3 |

TABLE 2

Systems without titanium chelate adhesion promoter

| | | Print medium (film) | | |
|---|---|---|---|---|
| Example | Cobinder | PP | PET Melinex 800 | PA Walomid XXL |
| 9 (Comparative) | Standard polyurethane (PUR 7313, BASE) | 1 | 1 | 1 |
| 10 | Polymer 1 | 4 | 4.5 | 4.5 |
| 11 | Polymer 3 | 4 | 4.5 | 4 |
| 12 | Polymer 4 | 5 | 4.5 | 4.5 |
| 13 | Polymer 5 | 5 | 5 | 3 |
| 14 | Polymer 6 | 5 | 5 | 5 |
| 15 | Polymer 7 | 5 | 4 | 5 |
| 16 | Polymer 8 | 5 | 5 | 5 |

PP = Polypropylene
PET = Polyethylene terephthalate
PA = Polyamide

The examples show that the adhesion of the inventive printing ink to different substrates is considerably better then when conventional polyurethanes are used as binders. With the use of conventional polyurethanes it is vital to add an adhesion promoter in order to be able to obtain useful results in some cases at least. On PA, the adhesion is unsatisfactory despite the use of adhesion promoter. Replacing the conventional polyurethane with hyperbranched polyurethanes makes it possible to increase the adhesion. With particular advantage, it is possible to omit adhesion promoter. Despite this, outstanding adhesion is achieved in all cases when hyperbranched polyurethanes are used.

EXAMPLES 17 AND 18

Use of the Inventive Printing Ink to Produce Laminates

To produce laminated packaging, printed polymer films, i.e., PE or PP films, are joined by laminations to other materials, such as metal foils, for example. Important performance properties of such laminates for use as laminated packaging include not only the strength of the laminate under normal storage conditions but also its strength under harsh conditions, such as during heating or sterilization, for example.

1) Composite Strength of Laminates:

By composite strength is meant the determination of the bond adhesion between two films or metal foils joined by lamination or extrusion (laminates).

Measuring and Testing Equipment:
Tensile strength tester from Zwick
Punch (width: 15 mm)

Sample Preparation:

In each case at least 2 strips (width: 15 mm) of the composite material under test must be cut longitudinally and transversely with respect to the film web. In order to facilitate the separation (delamination) of the composite, the ends of the strips punched out can be immersed in a suitable solvent (e.g., 2-butanone) until the materials part from one another. Thereafter, the specimen is carefully dried again.

Test Procedure:

The delaminated ends of the test specimens are clamped into the tensile strength tester. The less stretchable film should be placed in the upper clamp. When the machine is started up, the end of the specimen should be held at right angles to the direction of tension, thereby ensuring constant tension. The peel rate is 100 mm/min., and the peel angle of the separated films with respect to the unseparated complex is 90°.

Evaluation:

The composite strength figure is read off as an average, and reported in N/15 mm.

2) Boiling Strength of Laminates

This test method is used to assess the resistance of a printing ink film to boiling water.

Apparatus:
Hotplate with water bath.

Test Procedure:

The laminate is held immersed in a glass beaker filled with boiling water for 1 hour. The specimen is then removed from the water bath and cooled to room temperature.

Evaluation:

The composite strength of the laminates is assessed.

3) Sterilization Resistance of Laminates

This test method is used to assess the resistance of a printing ink film or a laminated assembly to steam.

Apparatus:
High pressure steam sterilizer

Test Procedure:

The assembly is placed in a glass beaker whose base is covered approximately with 1 cm of distilled water. The beaker is then placed in the steam pressure sterilizer and conditioned for 30 minutes.

Steam pressure sterilizer temperature: 121° C.; pressure: 1.3 bar. The specimen is then removed from the water and cooled to room temperature.

Evaluation:

The composite strength of the laminates is assessed.

EXAMPLES 17 AND 18

Sample Preparation:

The ink, diluted to printing viscosity, is pressed onto the prescribed print medium or drawn down using a 6 μm doctor knife. In parallel, the laminating foil or film (aluminum foil in Example 19 and PE film in Example 20) is coated with an adhesive/curative mixture (adhesive: Liofol UR7745, curative: UR6075 (Henkel), mixing ratio 6:1) so as to give a film thickness of approximately 6 μm (corresponding to about 2.5 g/m$^2$). Both films are then compressed in such a way that the printing ink and the adhesive come into contact. Following compression, the laminated films are stored at 60° C. for 5 days.

The following formulations (in parts by weight) are chosen for the examples:

| Standard formulation (comparative): | |
|---|---|
| 70.0 | pigment preparation (BASF Drucksysteme) |
| 8.0 | nitrocellulose (Wolf) |
| 1.0 | oleamide (Croda) |
| 0.5 | PE waxes (BASF AG) |
| 2.0 | dibutyl phthalate (Brenntag) |
| 10.5 | ethanol |
| 6.0* | conventional polyurethane PUR 7317 (BASF) |
| 2.0 | titanium chelate (DuPont) |
| Formulation 1 (inventive): | |
| 70.0 | pigment preparation (BASF Drucksysteme) |
| 8.0 | nitrocellulose (Wolf) |
| 1.0 | oleamide (Croda) |
| 0.5 | PE waxes (BASF AG) |
| 2.0 | dibutyl phthalate (Brenntag) |
| 10.5 | ethanol |
| 6.0$^{§)}$ | hyperbranched polyurethane, Polymer 1 |
| Formulation 2 (inventive): | |
| 70.0 | pigment preparation (BASF Drucksysteme) |
| 8.0 | nitrocellulose (Wolf) |
| 1.0 | oleamide (Croda) |
| 0.5 | PE waxes (BASF AG) |
| 2.0 | dibutyl phthalate (Brenntag) |
| 10.5 | ethanol |
| 6.0$^{§)}$ | hyperbranched polyurethane, Polymer 1 |
| 2.0 | titanium chelate (DuPont) |

$^{§)}$= The cobinder was prepared as a 75% strength solution in ethanol

| Example 17: Composite of PET and aluminum | |
|---|---|
| Print medium: | PET (Melinex 800) |
| Laminated foil: | aluminum |
| Composite strength | composite strength in N/15 mm: |
| color: | cyan |
| Standard formulation: | 2.40 |
| Formulation 1 | 4.44 |
| Formulation 2 | 4.97 |
| Boiling strength: | |
| Standard formulation: | no composite |
| Formulation 1 | 2.49 |
| Formulation 2 | 3.35 |
| Sterilization resistance: | |
| Standard formulation: | no composite |
| Formulation 1 | 1.36 |
| Formulation 2 | 3.80 |
| Example 18: Composite of PP and polyethylene | |
| Print medium: | PP (MB 400) |
| Laminated film: | polyethylene |
| Composite strength: | composite strength in N/15 mm: |
| color: | cyan |
| Standard formulation | 2.5 |
| Formulation 1 | 3.5 |
| Formulation 2 | 4.2 |

The examples shown that, with the printing inks of the invention comprising hyperbranched polyurethanes, outstanding adhesion is obtained even under harsh conditions.

We claim:

1. A process for the preparation of printing inks or of printing varnishes, said process comprising mixing or dispersing from a 10–50% by weight of one or more binders, at least one of the binders being a hyperbranched polyurethane having a variant molecular composition arid structure, wherein the hyperbranched polyurethane has on average at least 4 functional groups, from 20–80% by weight of a solvent or a mixture of different solvents, and, if applicable from 5 to 25% by weight of one or more colorants, and optionally up to 20% by weight of further additives, and wherein the solvent is water or a predominantly aqueous solvent mixture.

2. The process as claimed in claim 1, wherein the hyperbranched polyurethanes have functional groups which may be identical or different and are selected from the group consisting of —COOH, —COOR, —CONHR, —CONH$_2$, —OH, —SH, —NH$_2$, —NHR, —NR$_2$, —SO$_3$H, —SO$_3$R, —NHCOOR, —NHCONH$_2$, —NHCONHR, —CN and salts of said groups, wherein R denotes optionally substituted alkyl or aryl.

3. A process for the preparation of printing inks or of printing varnishes, said process comprising mixing or dispersing a hyperbranched polyurethane having a variant molecular composition and structure with other components, wherein the hyperbranched polyurethanes have functional groups which are identical or different and are selected from the group consisting of —COOH, —CONH$_2$, —OH, —SH, —NH$_2$, —NHR, —NR$_2$, —SO$_3$H and salts of said groups wherein the hyperbranched polyurethanes additionally have photochemically crosslinkable groups, and said process further comprises a solvent or a mixture of different solvents, and wherein the solvent is water or a predominantly aqueous solvent mixture.

4. The process as claimed in claim 1, wherein the hyperbranched polyurethanes have 4–30 functional groups.

5. A printing ink, comprising from 10–50% by weight of one or more binders, from 20–80% by weight of a solvent or a mixture of a plurality of solvents, from 5–25% by weight of at least one colorant, and optionally up to 20% by weight of further additives, wherein at least one of the binders is a hyperbranched polyurethane, and wherein the solvent is water or a predominantly aqueous solvent mixture.

6. A printing ink as claimed in claim 5, wherein the solvent mixture comprise organic solvents.

7. A radiation-curable printing ink, at least comprising at least one colorant, one or more binders and optionally further additives, wherein at least one of the binders is a hyperbranched polyurethane which has photochemically crosslinkable groups, and a solvent or a mixture of different solvents, and wherein the solvent is water or a predominantly aqueous solvent mixture.

8. A radiation-curable printing ink as claimed in claim 7, wherein the printing ink further comprises at least one photoinitiator or a photoinitiator system.

9. A radiation-curable printing ink as claimed in claim 8, wherein the printing ink additionally comprises at least one reactive diluent.

10. A printing varnish, comprising from 10–50% by weight of one or more binders, from 20–80% by weight of a solvent or a mixture of a plurality of solvents, and optionally up to 20% by weight of further additives, wherein at least one of the binders is a hyperbranched polyurethane, and wherein the solvent is water or a predominantly aqueous solvent mixture.

11. A printing varnish as claimed in claim 10, wherein at least one of the binders is a hyperbranched polyurethane which has photochemically crosslinkable groups, and wherein said printing varnish is radiation curable.

12. A process for priming print media or for coating printed print media, said process comprising applying the printing varnish of claim 10 to the print media, either before or after printing.

* * * * *